(12) United States Patent
Ai et al.

(10) Patent No.: US 8,734,281 B2
(45) Date of Patent: May 27, 2014

(54) DUAL-MODE ELECTROMECHANICAL VARIABLE SPEED TRANSMISSION APPARATUS AND METHOD OF CONTROL

(76) Inventors: Xiaolin Ai, Beijing (CN); Rui Xue, Beijing (CN); Zhonghe Xue, Beijing (CN); Xiaozhi Ai, Shenzhen (CN)

(*) Notice: Subject to any disclaimer, the term of this patent is extended or adjusted under 35 U.S.C. 154(b) by 147 days.

(21) Appl. No.: 12/744,584

(22) PCT Filed: Nov. 28, 2008

(86) PCT No.: PCT/CN2008/001945
§ 371 (c)(1), (2), (4) Date: May 25, 2010

(87) PCT Pub. No.: WO2009/079917
PCT Pub. Date: Jul. 2, 2009

(65) Prior Publication Data
US 2010/0261565 A1    Oct. 14, 2010

(30) Foreign Application Priority Data
Dec. 4, 2007 (CN) .......................... 2007 1 0195199

(51) Int. Cl.
| | |
|---|---|
| *F16H 37/06* | (2006.01) |
| *F16H 3/72* | (2006.01) |
| *F16H 48/06* | (2006.01) |
| *B60K 6/20* | (2007.10) |
| *B60K 6/445* | (2007.10) |

(52) U.S. Cl.
USPC ............... 475/5; 475/149; 475/151; 475/198; 180/65.21; 180/65.235

(58) Field of Classification Search
USPC ................................................ 475/2, 5, 149
See application file for complete search history.

(56) References Cited

U.S. PATENT DOCUMENTS

| | | | |
|---|---|---|---|
| 6,793,600 B2 * | 9/2004 | Hiraiwa ............................ | 475/5 |
| 7,645,205 B2 * | 1/2010 | Holmes ............................ | 475/5 |

(Continued)

FOREIGN PATENT DOCUMENTS

| | | |
|---|---|---|
| CN | 1563743 A | 1/2005 |
| CN | 1800681 | 7/2006 |
| CN | 101007533 A | 8/2007 |

OTHER PUBLICATIONS

Search Report for PCT Application No. PCT/CN2008/001945 dated Mar. 5, 2009.

*Primary Examiner* — David D Le
*Assistant Examiner* — Colby M Hansen
(74) *Attorney, Agent, or Firm* — Lucas & Mercanti, LLP

(57) ABSTRACT

A dual-mode electro-mechanical variable speed transmission includes an input shaft, an output shaft system, a gear system having at least three branches, two electric machines, and at least a clutch. The first electric machine couples to a branch of the gear system, the output shaft system couples to another branch of the gear system, the input shaft couples to the remaining branch or one of the remaining branches of the gear system, and the second electric machine selectively couples either to the same branch that is coupled to the output shaft system with a speed ratio or to one of the remaining branches that that is not coupled to the first electric machine with a different speed ratio. The transmission provides at least two power splitting modes to cover different speed ratio regimes. The transmission can also provide at least a fixed output shaft to input shaft speed ratio.

12 Claims, 6 Drawing Sheets

(56) References Cited

U.S. PATENT DOCUMENTS

| | | | |
|---|---|---|---|
| 7,972,237 B2* | 7/2011 | Ota | 475/5 |
| 8,277,350 B2* | 10/2012 | Ai et al. | 475/5 |
| 2001/0008859 A1* | 7/2001 | Masaki | 475/5 |
| 2003/0073534 A1* | 4/2003 | Oshidari et al. | 475/5 |
| 2006/0276288 A1 | 12/2006 | Iwanaka et al. | |
| 2007/0099738 A1* | 5/2007 | Holmes | 475/5 |
| 2008/0103002 A1* | 5/2008 | Holmes | 475/5 |
| 2008/0200296 A1* | 8/2008 | Holmes | 475/5 |

* cited by examiner

DUAL-MODE ELECTROMECHANICAL VARIABLE SPEED TRANSMISSION APPARATUS AND METHOD OF CONTROL

CROSS-REFERENCE TO RELATED APPLICATIONS

This application is a National Phase Application of PCT International Application No. PCT/CN2008/001945, International Filing Date Nov. 28, 2008, claiming priority of Chinese Patent Application 200710195199.8, filed Dec. 4, 2007, both of which are incorporated by reference herein.

FIELD OF THE INVENTION

The invention is related to a dual mode electro-mechanical variable speed transmission. It can be used in a wide variety of vehicle applications and power equipment.

BACKGROUND OF THE INVENTION

An internal combustion engine operates in a certain range of speed and power. Inside this range, there usually exists a smaller regime where the engine achieves optimal performance. On the other hand, driving conditions vary enormously, not only in wheel speed but also in driving torque at the drive wheels. A combination of a given speed and torque defines a power state. Matching the power state of the engine with that of the drive wheels is one of the primary functions for a transmission.

In recent years, the development of hybrid technology provides new avenues for achieving improved matching in power state between the internal combustion engine and the drive wheels. Among various power-train architecture designs, the most representative is the electro-mechanical continuous variable transmission, known as Toyota Hybrid System, or THS. THS uses the power split principle, splitting the input power into two paths of different type. Part of the input power passes through a mechanical power path which is comprised of gears and shafts; the rest passes through an electric power path which contains electric machines. The device that splits the power is a simple planetary gear system. THS has only one power splitting mode and provides a single output to input speed ratio node point SR where all power passes through the mechanical power path. When the transmission operates at a speed ratio higher than the speed ratio node point, internal power circulation occurs. One of the power paths sees more power than the power transmitted through the transmission, which reduces power transmission efficiency. This, to a large extent, constrains the effective operating speed ratio of the transmission. For high power vehicle applications, the power ratings for the electric machines have to be increased significantly.

SUMMARY OF INVENTION

One of the objectives of the current invention is to overcome the aforementioned drawbacks of prior art by providing a novel family of dual-mode electro-mechanical variable speed transmissions that share the common design feature and performance characteristics. These transmissions can operate under at least two different power splitting modes, offering higher power transmission efficiency by avoiding internal power circulation. These transmissions are capable of providing continuously variable output shaft to input shaft speed ratio and independent power regulation in a wide range. They significantly extend the operational speed ratio range.

To achieve above objectives, the current invention provides the following technical solution:

A dual-mode electro-mechanical variable speed transmission includes a gear system, an input shaft, an output shaft system, at least one clutch, and two electric machines along with their electric drives and controllers. Said gear system can be a three-branch planetary system, having at least three co-axial rotatable members or components. Each and every rotatable component constitutes a branch in the gear system. The three-branch gear system is also known as the three-shaft gear system. It has two degrees of freedom: the speeds of any two branches uniquely determine the speed of the remaining branch. Using vertical vectors to represent the rotational speeds of the three branches of the gear system and lining the vectors up in the horizontal direction with predetermined distances between them, a so-called speed nomograph, shown in FIG. 1, is constructed. Each vector corresponds to a branch. Each branch according to its position from left to right (or from right to left) on the speed nomograph, is referred to as the first (I), second (II) and third (III) branch of the gear system, respectively. The end point of speed vectors lies on a straight line, which is referred to as the speed line. For a three-branch gear system, the relationship among the rotational speeds of the branches of the gear system is uniquely defined by a characteristic parameter of the gear system $K_a$, where $K_a$ is the distance between the first branch and the second branch, assuming the distance between the second and third branch is 1.0 unit. The unit can be inch or centimeter, or any engineering measures in length. The gear system is connected to the input shaft, the output shaft system, and to the first and second electric machines in the following configuration: the input shaft connects to a branch of the gear system, establishing a fixed speed ratio between them; the output shaft system connects to another branch of the gear system, establishing a fixed speed ratio; the first electric machine connects to the remaining branch of the gear system, establishing a fixed speed ratio; the second electric machine selectively connects to the two branches of the gear system that are not in directly connection with the first electric machine, establishing at least two speed ratios, respectively.

The gear system can also be a four-branch gear system having at least four co-axially rotatable members or components. Each of the co-axial rotatable components is associated with a corresponding branch of the four-branch gear system. The four-branch gear system is also known as four-shaft gear system. The four-branch gear system also has two degrees of rotational freedom. That is to say, the speeds of any two branches of the four-branch gear system uniquely determine the speeds of remaining branches. A four-branch gear system can be represented by a four-branch speed nomograph, as shown in FIG. 2. The vertical vectors in FIG. 2 represent the rotational speeds of the four branches. Similarly, according to their positions from left to right (or from right to left) on the four-branch speed nomograph, these four branches are referred to as the first branch (I), the second branch (II), the third branch (III) and the fourth branch (IV), respectively. The distances between the speed vectors which are associated with the corresponding branches of the four-branch gear system, are uniquely determined by the characteristic parameters $K_a$ and $K_b$ of the gear system. Here it is assumed that the distance between the fourth and the third branches is 1.0 unit. $K_a$ is defined as the distance between the third branch and the second branch; $K_b$ is defined as the distance between the third branch and the first branch. The four-branch gear system is connected to the input shaft, the output shaft system and the first and second electric machines in the following configuration: the input shaft connects to one of the four branches with a fixed speed ratio; the output shaft system connects to another branch of the four-branch gear system with a fixed speed ratio; the first electric machine connects to one of the two remaining branches of the four-branch gear system with a fixed speed ratio; the second electric machine selectively connects either to the same branch that is connected to the output shaft system with a speed ratio or to the last remaining branch of the four-branch gear system with a different speed ratio.

The dual-mode electro-mechanical variable speed transmission includes at least a counter shaft and at least a clutch installed on the counter shaft. The second electric machine selectively couples to the two different branches of the gear system via the counter shaft and the clutch or clutches, providing two different power splitting modes. To ensure speed synchronization between the components that the clutch is to connect during the shifting between the two power split modes, the speed ratios between the second electric machine and the branch it connects and between the second electric machine and the branch it is about to connect must satisfy a predetermined proportional relationship. Said relationship is determined by the characteristic parameters of the gear system. At the switching point between the different power splitting modes, the torque of the second electric machine is essentially zero. No torque impact exerts on the clutch. This leads to a smooth, continuous and non-interruptive operation in terms of speed, torque and power for components associated with the input shaft, the output shaft system and the first and second electric machines.

Said dual-mode electro-mechanical variable speed transmission may further include a brake or brakes. In general, the clutch and the brake are referred to as torque transfer devices. Through a coordinated operation of said torque transfer devices, the transmission may function as a stepwise transmission, providing at least a fixed speed ratio, in addition to the continuously variable speed ratio. Fixed speed ratio operation may be desirable for special applications.

The current invention also provides a method for design, producing and operating said dual-mode electro-mechanical variable speed transmission. Said method includes following steps: (1) Produce a planetary gear system; said planetary gear system includes at least four co-axial rotate-able components with each corresponding to a branch of the gear system; said planetary gear system has two degrees of rotational freedom; the speeds of any two branches uniquely determine the speeds of all other branches in the planetary gear system; said planetary gear system can be represented by a speed nomograph; the distance between the first and third branches is denoted by $K_b$, the distance between the second and third branches is $K_a$, the distance between the fourth and the third branches is 1 unit. (2) Provide a first electric machine and a second electric machine; the maximum continuous power ratings of the electric machines are set to be no less than $P_{em}$. (3) Design and produce an input shaft, making it capable of transmitting a maximum power no less than $P_{in}$. (4) Design and produce an output shaft system. (5) Design and produce a clutch or clutches, having at least an engagement position. (6) Connect, with a fixed speed ratio, the first electric machine to the first branch of the planetary gear system; connect, with a fixed speed ratio, the output shaft system to the second branch of the planetary gear system; connect, with a fixed speed ratio, the input shaft to the third branch of the planetary gear system, and selectively connect the second electric machine to the second branch of the planetary gear system with a speed ratio of GR×GR1 or to the fourth branch of the planetary gear system with a speed ratio of GR×GR2, where GR×GR1 is the speed ratio of the second branch to the second electric machine, and GR×GR2 is the speed ratio of the fourth branch to the second electric machine; in doing so, a dual-mode variable speed transmission is constructed. (7) Operate said transmission to provide at least two different operation modes; switching between operating modes is achieved by using clutch or clutches; at switching point, the components to be engaged by the clutch or clutches are automatically synchronized with no discontinuity in speed; at switching point, the speed ratio between the second branch and the third branch of the planetary gear system is denoted by $SR_b$. (8) Select the characteristic parameters $K_a$ and $K_b$ of the planetary gear system such that the following relationship holds true, $$\frac{(K_a+1)(1-SR_b)}{K_a \cdot SR_b} + 1 = \frac{GR2}{GR1};$$

$$\frac{K_b(K_a+1)}{K_b - K_a} \leq \left(\frac{1 + P_{em}/P_{in}}{1 - P_{em}/P_{in}}\right)^2$$

Above mentioned technical solution has following benefits: it offers a novel dual-mode electro-mechanical variable speed transmission with reduced power demands on electric machines. Said transmission has simple and compact structure and low manufacturing cost. It is capable of providing continuous operation from reverse to stop to forward, without requiring the conventional launching device. Said transmission significantly improves the overall efficiency of the vehicle.

BRIEF DESCRIPTION OF THE DRAWINGS

In the accompany drawings which form part of the specification.

DETAILED DESCRIPTION OF THE INVENTION

The current invention can have various embodiments and configurations that incarnate the spirit of current invention. Embodiments and configurations disclosed thereafter in text and in illustrations are used for the purpose of explanation only and shall not be interpreted as limitation to the scope of the current invention. The following detailed description illustrates the invention by way of example and not by way of limitation.

Figure 1:
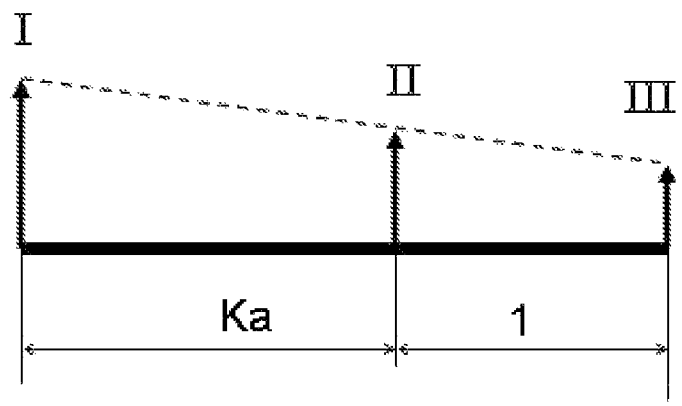
FIG. 1 is a three-branch speed nomograph, describing the rotational speed relationship among co-axial rotating components of the three-branch gear system.
Figure 2:
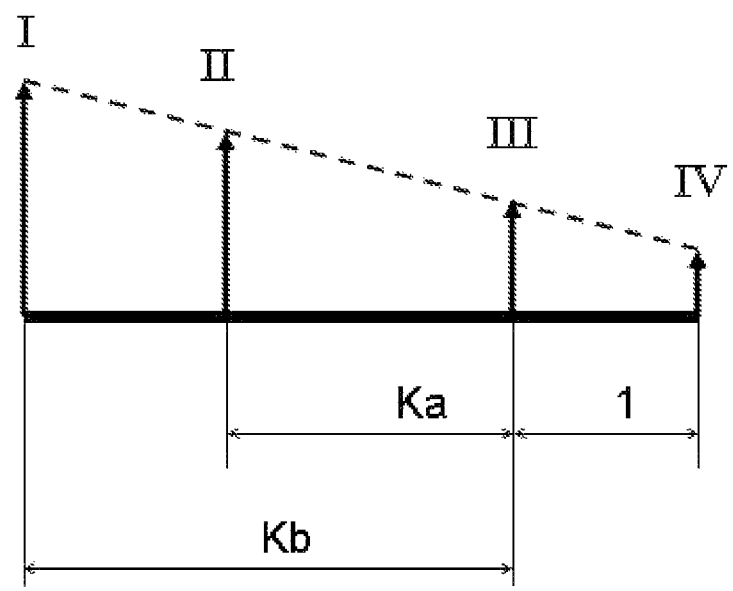
FIG. 2 is a four-branch speed nomograph, describing the rotational speed relationship among co-axial rotating components of the four-branch gear system.
Figure 3:
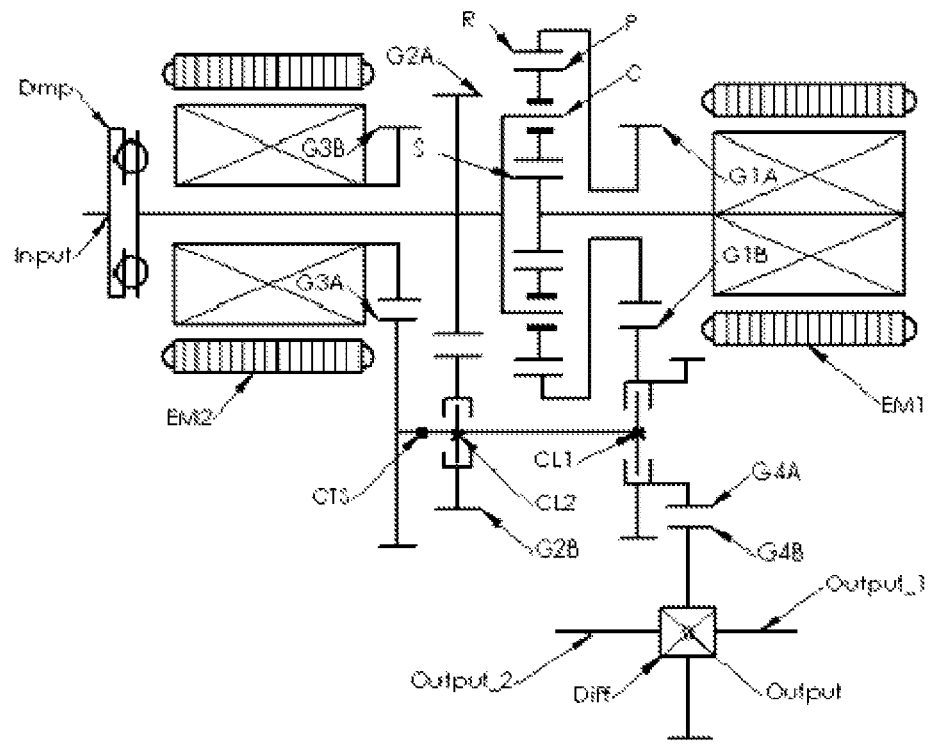
FIG. 3 is a schematic diagram of a preferred embodiment (embodiment 1) of dual-mode electro-mechanical transmission of the current invention.

FIG. 3 shows a preferred embodiment, the embodiment 1 of current invention. The dual-mode electro-mechanical variable speed transmission is comprised of a three-branch gear system, an input shaft (Input), an output shaft system (Output), a first clutch (CL1), a second clutch (CL2), a counter shaft (CTS), a first electric machine (EM1) and a second electric machine (EM2), along with the associated drives and controllers (not shown) for the electric machines. Said three-branch gear system is a simple planetary gear-train, having a ring gear (R), a set of planet gears (P), a planet carrier C and a sun gear (S). The ring gear (R) is in internal meshing engagement with the planet gears (P); the sun gear (S) is in external meshing engagement with the planet gears (P). The sun gear (S) constitutes the first branch (I) of the three-branch gear system; the planet carrier (C) constitutes the second branch (II) of the three-branch gear system; and the ring gear (R) constitutes the third branch (III) of the three-branch gear system. The characteristic parameter $K_a$ of the three-branch gear system is uniquely determined by the teeth number $Z_R$ of the ring gear and the teeth number of the sun gear $Z_S$. The output shaft system further includes a differential (Diff), a first half-shaft (Output_1) and a second half-shaft (Output_2). Each electric machine is comprised of a rotor and a stator. For three-branch gear system shown in embodiment 1, the characteristic parameter is expressed as:

$$K_a = \frac{Z_R}{Z_S} \quad (1)$$

In embodiment 1, the rotor of the first electric machine EM1 is directly coupled to sun gear S, establishing a fixed connection with the first branch (I) of the three-branch gear system with a fixed speed ratio of 1. The input shaft (Input) couples to the planet carrier C via a torsion damper or a shack load absorber (Dmp), establishing a connection with the second branch (II) of the three-branch gear system with a fixed speed ratio of 1. The output shaft system (Output) couples to ring gear R via two pairs of gears G1A and G1B, and G4A and G4B, establishing a connection with the third branch (III) of the three-branch gear system with a speed ratio of GR1×GR4. The second electric machine EM2, couples either to the ring gear R through gears G1A and G1B, and gears G3A and G3B, establishing a first selective connection to the third branch of the three-branch gear system with a speed ratio of GR1×GR3, or to the planet carrier C through gears G2A and G2B, and gears G3A and G3B, establishing a second selective connection to the second branch of the three-branch gear system with a speed ratio of GR2×GR3. Here GR1, GR2, GR3 and GR4 are gear teeth ratios, defined respectively as, $$GR1 = \frac{Z_{G1B}}{Z_{G1A}}; GR2 = \frac{Z_{G2B}}{Z_{G2A}}; GR3 = \frac{Z_{G3B}}{Z_{G3A}}; GR4 = \frac{Z_{G4B}}{Z_{G4A}} \quad (2)$$

where Z denotes the number of teeth with its subscript representing the corresponding gear. For example, $Z_{G1A}$ denotes the number of teeth for gear G1A. The structure and connection characteristics that the embodiment 1 represents can be expressed as:

S(EM1)–C(Input,EM2[CL2])–R(Output,EM2[CL1])

Each term, separated by the symbol "-" in above expression represents a branch. The total number of terms represents the number of branches of the gear system. In this example, the expression has three terms, thus representing a three-branch gear system. The first term represents the first branch of the three-branch gear system; the second term represents the second branch of the three-branch gear system and the third term represents the third branch of the three-branch gear system. The symbol used in each term denotes the corresponding rotational components of the gear system. For example, the first term S in above expression represents the sun gear. The content in the round brackets following each term represents the component or components that is connected to the branch the term represents. For example, the first term S(EM1) in above expression denotes that the first electric machine EM1 is connected to the sun gear S at the first branch of the gear system. When the connection of a component to a branch is made through a clutch, the corresponding clutch is placed in square brackets after the component. In this case, the connection is a selective connection. For example, the second term C(Input,EM2[CL2]) in above expression denotes that the input shaft (Input) is connected to the carrier C at the second branch of the gear system and the second electric machine EM2 is selectively connected to the carrier C through clutch CL2 at the second branch.

The first and second electric machines EM1 and EM2, along with their respective drives, are electrically connected to transmit power. When the dual-mode electro-mechanical variable speed transmission is used in a hybrid vehicle, the hybrid system may further include an energy storage device (BT, not shown in illustrations) to store and recapture energy.

When the second electric machine EM2 is connected to the ring gear R, clutch CL1 engages and clutch CL2 disengages. The transmission is operated under an output power split mode. The input power is split into two paths and transmitted to the output shaft system. One is the mechanical path that goes from the input shaft (Input), through the planet carrier C, the planets P, the ring gear R and the output gear sets G1A and G1B, and G4A and G4B to the output shaft system (Output); the other is the electrical path that goes from input shaft (Input), through the planet carrier C, the planets P, the sun gear S, the first electric machine EM1, the second electric machine EM2, gear set G3B, G3A, the counter shaft CTS, clutch CL1, and gear set G4A and G4B to the output shaft system (Output).

When the second electric machine EM2 is connected to the planet carrier C, clutch CL2 engages and clutch CL1 disengages. The transmission is operated under a so-called input power split mode. Similarly, the input power is split and transmitted to the output shaft system through two power paths. The mechanical power path goes from the input shaft (Input), the planet carrier C, the planet gears P, the ring gear R, and the gear sets G1A and G1B, and G4A and G4B to the output shaft system (Output); the electrical power path goes from the input shaft (Input), gear set G2A and G2B, clutch CL2, counter shaft CTS, gear set G3A and G3B, the second electric machine EM2, the first electric machine EM1, the sun gear S, and then through the planet carrier C, the ring gear R, gear sets G1A and G1B, and G4A and G4B to the output shaft system (Output).

To facilitate the description, the ratio of the output shaft system (Output) speed (speed of gear G4B) to the input shaft (Input) speed is defined as the output-to-input speed ratio of the transmission and is simply referred to thereafter as the speed ratio, SR. A speed ratio node is defined as a specific value in speed ratio at which at least one of the electric machines achieves zero rotational speed. A speed ratio node is also referred to as a speed ratio node point.

The first embodiment (embodiment 1) is capable of providing a natural speed ratio node SR0 where the speed of the output shaft system is zero and a regular speed ratio node SR1. At the regular speed ratio node, at least one of the electric machines achieves zero rotational speed. If a transmission offers more than one regular speed ratio nodes, in ascending order, these regular speed nodes are referred to as the first speed ratio node, the second speed ratio node and so on, respectively. For embodiment 1, the regular speed ratio node SR1 is the first speed ratio node where the rotational speed of the first electric machine is zero. The natural speed ratio node SR0 divides the entire speed ratio regime into a forward speed ratio regime and a reverse speed ratio regime. Above the natural speed ratio node is the forward regime; below the natural speed ratio node is the reverse regime. The first speed ratio node SR1 further divides the forward regime into a low speed ratio regime and a high speed ratio regime. Below the first speed ratio node is the low speed ratio regime and above the first speed ratio node is the high speed ratio regime.

At the first speed ratio node point SR1, the torque of the second electric machine EM2 is zero if there is no net power exchange between the transmission and the energy storage device. Thus, it would be advantageous to choose SR1 as the switching point between different power splitting modes to avoid or reduce shock load in torque for the transmission. In the low speed ratio regime below SR1, the transmission adopts output power split operation mode; in the high speed ratio regime above SR1, the transmission adopts input power split operation mode. In the reverse regime, the hybrid system operates under pure electric drive mode. Thus, the power in each path, whether mechanical path or electric path, is always less than the power transmitted through the transmission from the input shaft to the output shaft system. No internal power circulation exists in any speed ratio regime for the dual mode electro-mechanical variable speed transmission. The speed ratio range of the transmission is thus effectively extended. To ensure speed synchronization of the clutch at the mode switching point SR1, the following relationship between the gear ratios has to be satisfied, $$\frac{GR2}{GR1} = \frac{K_a}{K_a+1} \quad (3)$$

The operation of the dual mode electro-mechanic variable speed transmission shown in FIG. 3 is described below.

Slow Speed Region.

Before the vehicle starts moving, the transmission operates under low speed ratio regime. The second electric machine EM2, couples to the output shaft system through clutch CL1. The first electric machine EM1 is idling with rotational speed in the same direction as the input shaft that is coupled to the internal combustion engine. The second electric machine EM2 is at zero speed. When the vehicle starts, the electric drive (CTRL, not shown) of the electric machine delivers electric power to the second electric machine, providing drive torque according to commends it receives. The drive torque is amplified through two-stage gears G3A and G3B, and G4B and G4A, and applied to the output shaft system (Output). At this moment, except for small amount internal losses, the second electric machine EM2 consumes or converts essentially no power. The vehicle is at stand still; there is only torque demand and no power demand of the drive wheels. The torque demand is primarily supplied by the second electric machine EM2. Concurrently, the internal combustion engine provides no torque for vehicle launching, and thus delivers essentially zero power to the input shaft. As the second electric machine increases its drive torque, the vehicle starts to move. Consequently, the second electric machine starts to rotate. The rotational speed of the first electric machine decreases as the vehicle gradually picking up the speed. Accordingly, the second electric machine starts to consume electric power, converting it into the required mechanical power to drive the vehicle. The consumed electric power is fully or partially supplied by the first electric machine through the electric drive (CTRL). To balance the torque of the first electric machine, the internal combustion engine is now providing necessary drive torque. After vehicle started moving, the drive torque required by the vehicle is provided collaboratively by both the internal combustion engine and the second electric machine EM2. The torque of the second electric machine reduces gradually.

As the speed of the vehicle continues to increase, the speed of the second electric machine increases and its torque further reduces. In contrast, the speed of the first electric machine continues to decrease, till it becomes zero. At this point, the first electric machine reaches its zero speed node point. Correspondingly, the transmission arrives at its regular speed ratio node point SR1. Assuming there is no net electric power exchange between the transmission and the energy storage device, the speed ratio of the transmission at which the speed of the first electric machine EM1 becomes zero coincides with the speed ratio at which the torque of the second electric machine EM2 is zero.

High Speed Region

The speed ratio node point SR1 of the transmission is the dividing point between the slow and high speed ratio regimes. At this switching point SR1, the torque of the second machine is zero (assuming there is no net electric power exchange between the transmission and energy storage device); the rotational components associated with clutches CL1, CL2 are synchronized. During the switching of the operation mode, the second clutch CL2 engages, connecting the second electric machine EM2 to the input shaft. Following this event, the first clutch CL1 disengages, releasing the second electric machine EM2 from the output shaft system. In doing so, the transmission adopts the input power split operation mode to avoid internal power circulation.

As the speed of vehicle further increases, the speed ratio of the transmission increases to exceed the speed ratio node point SR1. The speed of the first electric machine EM1 starts to increase from zero in a reversed direction with respect to internal combustion engine. The speed of the second electric machine EM2 varies with speed of engine at a fixed speed ratio. Assuming there is no net electric power delivered to or received from the energy storage device, the torque of the second electric machine will be increasing in a reversed direction from zero concurrently. Under this condition, the second electric machine EM2 acts as a generator, converting mechanical power into electric power to feed the first electric machine EM1. The first electric machine EM1 acts as a motor, converting electric power into mechanical drive power.

The transmission shown in FIG. 3 provides at least one fixed output-to-input speed ratio of the transmission to fulfill the demands that may be required in certain applications. The fixed output-to-input speed ratio operation is achieved by engaging both clutch CL1 and clutch CL2. Under this condition, the transmission transmits power through mechanical power path.

The first embodiment, embodiment 1, has other variations. For example, the connection of the input shaft to the planetary gear and the connection of the output shaft system to the planetary gear are exchangeable; that is to say, the output shaft system connects to the second branch C of the three-branch gear system and the input shaft connects to the third branch R. This leads to embodiment 1A. The structure and connection characteristics of embodiment 1A can be expressed as:

$$S(EM1)-C(Output,EM2[CL2])-R(Input,EM2[CL1])$$

Accordingly, the condition for synchronization of clutches is set forth by, $$\frac{GR2}{GR1} = 1 + \frac{1}{K_a} \qquad (4)$$

Figure 4:
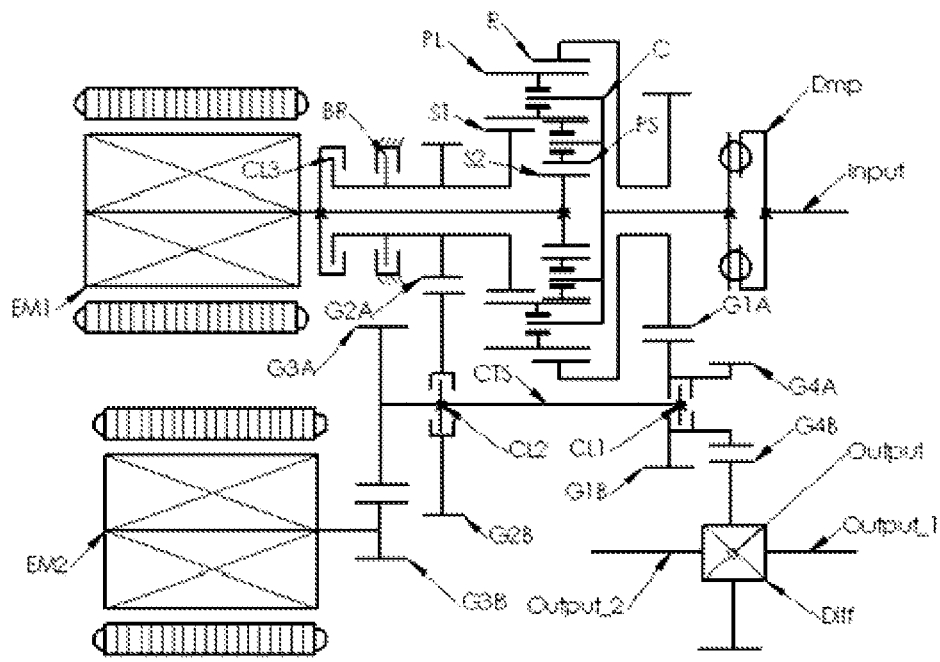
FIG. 4 is a schematic diagram of another preferred embodiment (embodiment 2) of dual-mode electro-mechanical transmission of the current invention.

FIG. 4 shows embodiment 2 of the current invention. It represents a typical example of the second type of embodiments. The transmission shown in FIG. 4 is comprised of a four-branch planetary gear system, an input shaft (Input), a counter shaft (CTS), an output shaft system (Output), a first clutch CL1, a second clutch CL2, a first electric machine EM1 and a second electric machine EM2 along with the electric drives (CTRL, not shown) for the electric machines. The four-branch planetary gear system is constituted by a Ravigneaux planetary gear-train. It contains a large sun gear S1, a small sun gear S2, a set of long planet gears PL, a set of short planet gears PS, a ring gear R and a planet carrier C. Each of the long planet gears PL is in internal meshing engagement with the ring gear R and in external meshing engagement with the large sun gear S1; each of the short planet gears PS is in external meshing engagement with a corresponding long planet gear PL and with the small sun gear S2. Said small sun gear S2 constitutes the first branch (I) of the four-branch gear system, the ring gear R constitutes the second branch (II), the planet carrier C constitutes the third branch (III) and the large sun gear S1 constitutes the fourth branch (IV). The characteristic parameters $K_a$ and $K_b$ are uniquely determined by the teeth number of the ring gear $Z_R$, the teeth number of the large sun gear $Z_{S1}$, and the teeth number of the small sun gear $Z_{S2}$.

$$K_a = \frac{Z_{S1}}{Z_R}; K_b = \frac{Z_{S1}}{Z_{S2}} \qquad (5)$$

Referring to FIG. 4, the transmission further includes a first set of meshing gears G1A and G1B, a second set of meshing gears G2A and G2B, a third set of meshing gears G3A and G3B and a fourth set of meshing gears G4A and G4B. The output shaft system includes a differential (Duff), a first output half-shaft (Output_1) and a second output half-shaft (Output_2). Each electric machine comprises a rotor and a stator, respectively.

The rotor of the first electric machine EM1 is coupled directly to the small sun gear S2, establishing a fixed connection with the first branch of the four-branch gear system with a speed ratio of 1.0. The output shaft system (Output) couples to the ring gear R via two stages of meshing gears G1A, G1B and G4A, G4B, establishing a fixed connection to the second branch of the four-branch gear system with a speed ratio of GR1×GR4. The input shaft (Input) couples to the planet carrier C through a torsion damper (Dmp), establishing a connection to the third branch of the four-branch gear system with a speed ratio of 1.0. The second electric machine EM2 couples selectively either to the ring gear R through two stages of gears G1A and G1B, and G3A and G3B, establishing a first selective connection to the second branch of the four-branch gear system with a first speed ratio of GR1×GR3, or to the large sun gear S1 through two stages of gears G2A and G2B, and G3A and G3B, establishing a second selective connection to the fourth branch of the four-branch gear system with a second speed ratio of GR2×GR3. Here GR1, GR2, GR3 and GR4 are gear ratios defined previously. The structure and connection characteristics of embodiment 2 can be expressed as:

$$S2(EM1)-R(Output,EM2[CL1])-C(Input)-S1(EM2[CL2])$$

The notations and definitions of symbols employed in above expression are the same as previously described.

Similarly, the first and second electric machines along with their respective drives and controllers are electrically connected for transmitting electric power and signals. When used in hybrid vehicle applications, the system may further include an energy storage device (BT) for storing and recapturing energy.

When the second electric machine EM2 is selectively connected to the ring gear R, clutch CL1 engages and clutch CL2 disengages. The transmission operates under the so-called output power split mode. Input power is transmitted to the output shaft system through two power paths. One is the mechanic power path that goes from the input shaft (Input), through the planet carrier C, the long planet gear PL, the ring gear R, gear sets G1A and G1B, and G4A and G4B to the output shaft system (Output); the other is the electric power path that goes from the input shaft (Input), through the planet carrier C, the small sun gear S2, the first electric machine EM1, the second electric machine EM2, gear set G3B and G3A, clutch CL1, gear set G4A and G4B to the output shaft system (Output).

When the second electric machine EM2 is selectively connected to the large sun gear S1, clutch CL2 engages and clutch CL1 disengages. The transmission operates under a so-called compound power split mode. Input power is delivered to the output shaft system through two power paths: a mechanical power path and an electric power path. The mechanical power path goes from the input shaft (Input), through the planet carrier C, the long planet PL, the ring gear R, gear sets G1A and G1B, and G4A and G4B to the output shaft system (Output); the electric power path goes from the input shaft (Input), through the planet carrier C, the large sun gear S1, gear set G2A and G2B, clutch CL2, gear set G3A and G3B, the second electric machine EM2, the first electric machine EM1, the small sun gear S2, then through the large sun gear S1, the ring gear R, gear sets G1A and G1B, and G4A and G4B to the output shaft system (Output).

Embodiment 2 is capable of providing three output-to-input speed ratio node points, including a natural speed ratio node point SR0 where the output shaft system is at zero speed and two regular speed ratio node points, SR1 and SR2. At a speed ratio node point, at least one of the electric machines is at zero rotational speed. The natural speed ratio node point SR0 divides the entire speed ratio regime into a forward regime and a reverse regime. Above SR0 is the forward regime and below SR0 is the reverse regime. The first speed ratio node point SR1, further divides the forward regime into low and high speed ratio regimes. Below SR1 is the low speed ratio regime, and above SR1 is the high speed ratio regime.

At the first speed ratio node point SR1, the second electric machine EM2 provides zero torque if there is no net power exchange between the transmission and the energy storage device. Therefore, it is beneficial to choose SR1 as the switching point for changing power split mode in order to reduce or avoid possible impact torque load to transmission. Taking into consideration of possible internal power losses of the electric machines and the associated drives, the actual switching point in SR may be in the vicinity of SR1. The output power split operating mode is adopted at the low speed ratio regime below SR1, the compound power split operating mode is adopted at the mid to high speed ratio regime above SR1. In reverse regime pure electric drive mode could be adopted to effectively avoid internal power circulation. To ensure rotational speed synchronization for clutch at a chosen switching speed ratio $SR_s$, the gear ratios have to satisfy following relationship:

$$\frac{GR2}{GR1} = 1 + \frac{(K_a + 1)(1 - GR1 \cdot GR4 \cdot SR_s)}{K_a \cdot GR1 \cdot GR4 \cdot SR_s} \quad (6a)$$

where $GR1 \times GR4 \times SR_s$ is the speed ratio of the second branch (II) to the third branch (III) of the four-branch gear system, and is denoted as $SR_b$. That is $SR_b = GR1 \times GR4 \times SR_s$. Substituting $SR_b$ into the equation (6a), yields $$\frac{GR2}{GR1} = 1 + \frac{(K_a + 1)(1 - SR_b)}{K_a SR_b} \quad (6b)$$

When choosing the first speed ratio node point SR1 as the operating mode switching point, that is to say $SR_s$=SR1, above equation can be simplified as:

$$\frac{GR2}{GR1} = \frac{K_b + 1}{K_b - K_a} \quad (6c)$$

The functions and the operations of the dual-mode electro-mechanical variable speed transmission shown in FIG. 4 are described below:

Continuously Variable Speed Operation

1. Low Speed Ratio Regime

Before the vehicle starts to move, transmission is set to operate in low speed ratio regime. The second electric machine EM2 couples through clutch CL1 to the output shaft system (Output). The first electric machine EM1 is idling and rotating in the direction opposite to that of the internal combustion engine. The second electric machine EM2 is at zero speed. As the vehicle starts, the controller sends commends to drive circuit. The drive circuit, in turn, provides the required electric power to the second electric machine EM2, generating a driving torque. The drive torque is amplified through two-stage gear sets G3A and G3B, and G4B and G4A, and delivered to the output shaft system. At this moment, except for an insignificant amount of internal power losses, the second electric machine EM2 does not yet convert any electric power into mechanical power. Because the vehicle is still at a standstill, there is no requirement for drive power but drive torque at the drive wheels. The drive torque to move the vehicle comes primarily from the second electric machine EM2. Concurrently, the internal combustion engine provides zero starting torque for the vehicle, thus there is no power output form the engine. As the torque of the electric machine increases, the vehicle accelerates from standstill and moves forward. Accordingly, the second electric machine EM2 starts to rotate. Meanwhile, the speed of the first electric machine EM1 gradually reduces to comply with the increased vehicle speed. As the second electric machine EM2 rotates, it begins to consume electric power, converting the electric power into the required mechanical drive power. The consumed electric power is fully or partially provided by the first electric machine EM1 through electric drives and controllers (CTRL). To balance the torque load of the first electric machine EM1, the internal combustion engine must provide the necessary torque. After the vehicle starts moving, the drive torque at the drive wheels is shared between the internal combustion engine and the second electric machine EM2, causing the torque of the second electric machine EM2 to decrease.

As the speed of vehicle increases, the rotational speed of the second electric machine EM2 increases but its torque continues to decrease. On the contrary, the speed of the first electric machine EM1 continues to decrease until it reaches zero. At the moment when the first electric machine EM1 stops rotating, the transmission arrives at its first regular speed ratio node point SR1. Assuming there is no net electric power exchange between the transmission and the energy storage device, the zero torque point (a speed ratio node point that corresponds to the zero torque of an electric machine) of the second electric machine EM2 coincides with the zero speed point (a speed ratio node point that corresponds to zero speed of an electric machine) of the first electric machine EM1.

2. High Speed Ratio Regime

The first speed ratio node point SR1 marks the transition from a low speed ratio regime to a high speed ratio regime, or vice versa. At the operation mode switching point, the second electric machine EM2 is at zero torque and the engaging components of the first and second clutches are synchronized. At this moment, the second clutch CL2 engages, connecting the second electric machine EM2 to the large sun gear S1 through gear sets G3A and G3B, and G2A and G2B. Immediately after the second clutch's engagement, the first clutch CL1 starts to disengage, disconnecting the second electric machine EM2 from the output shaft system. Transmission is now operating under the compound power split mode.

As the speed of the vehicle further increases, the speed ratio of the transmission increases, exceeding the first regular speed ratio node point SR1. The rotational speed of the first electric machine EM1, rises from zero and continues to increase in the same direction as the input shaft from the internal combustion engine. The speed of the second electric machine EM2 starts to decrease. At this moment, should there be no net electric power exchange between the transmission and energy storage device, the torque of the second electric machine EM2 will rise from zero and increase in value acting in the opposite direction. The second electric machine EM2 functions as a generator, providing electric power to the first electric machine EM1 and/or to the energy storage device. The first electric machine EM1 acts as a motor, converting electric power into mechanical power.

As the vehicle continues to increase in speed, the speed of the second electric machine EM2 continues to decrease until it becomes zero. The transmission then reaches its second speed ratio node point SR2. At this speed ratio node point, the power transmitted through the electric power path becomes zero; all power is transmitted from input shaft to the output shaft system through the mechanical power path.

Between the first speed ratio node point SR1 and the second speed ratio node point SR2, the power split ratio PR, defined as the power transmitted through the electric power path to the power delivered at the input shaft, possesses a local maximum value. The maximum value is dependent upon the characteristic parameters of the four-branch gear system. Assuming the maximum input power of the transmission is $P_{in}$ and the maximum continuous power rating of the electric machine is $P_{em}$, the power ratio of the maximum continuous power rating of the electric machine to the maximum input power of the transmission is denoted as $PR_{max}=P_{em}/P_{in}$. For an adequate matching between the sizes of electric machines and the construction of the transmission, so that the transmission can be operated continuously and appropriately between the first and second regular speed ratio node points, the characteristic parameters of the four-branch gear system must satisfy following condition:

$$\frac{K_b(K_a+1)}{K_b-K_a} \leq \left(\frac{1+PR_{max}}{1-PR_{max}}\right)^2 \quad (7)$$

At or in the vicinity of the second speed ratio node point SR2, the torque of the first electric machine EM1 reverses its direction. As the speed ratio of the transmission continues to increase, the speed of the first electric machine EM1 continues to increase; concurrently, the speed of the second electric machine EM2 rises from zero and increases in reverse direction. To avoid excessive internal power circulation when the speed ratio of the transmission exceeds far beyond the second speed ratio node point SR2, a brake BR may be employed in the transmission to brake the large sun gear S1, namely the fourth branch of the four-branch gear system, when it is deemed necessary.

3. Reverse Regime

The regime below the natural speed ratio node point SR0 is referred to as the reverse regime. In this regime, the output power split mode is also applicable. The first clutch CL1 engages and the second clutch CL2 disengages. The power is delivered from the ring gear R through two gear stages G1A and G1B, and G4A and G4B to the output shaft system (Output).

To restrict the power split ratio of the electric power path avoid internal power circulation, pure electric drive mode may be adopted in the reverse regime. To this end, the electric machine controller (CTRL) controls the second electric machine EM2 to convert electric power from the energy storage (BT) into mechanical power, delivering it to the output shaft system. The drive torque from the second electric machine EM2 is amplified through the third gear set G3A and G3B and fourth gear set G4A and G4B, and then delivered to the output shaft system.

In fact, pure electric drive operation mode is also applicable in forward speed ratio regime.

Geared Neutral and Parking

Embodiment 2 is capable of providing practical and useful functions including geared neutral and parking. When both the first and second clutch CL1 and CL2 are disengaged and the first electric machine EM1 is switched off or at idle state, the transmission is in geared neutral.

Parking can be achieved by engaging the brake BR and both the first and second clutches CL1 and CL2. If a third clutch CL3 (FIG. 4) is installed between the first and the fourth branches of the four-branch gear system, that is between the large sun gear S1 and the small sun gear S2 for this particular embodiment, parking can also be achieved by engaging both the brake BR and the third clutch CL3. In addition, parking can be achieved by conventional parking gear and claws (PBR, not shown) installed on the output shaft system.

Fixed Speed Ratio Operation

Embodiment 2 of the current invention is capable of offering operations at up to three fixed speed ratios. The fixed speed ratio operations are provided for special application requirements such as towing and acceleration during hill climbing. The conditions for fixed speed ratio operations are listed in the following table.

| Fixed speed-ratio position | Status of clutch and brake | | | |
| --- | --- | --- | --- | --- |
|  | CL1 | CL2 | CL3 | BR |
| 1 | engage | engage | disengage | disengage |
| 2 | disengage | engage | engage | disengage |
| 3 | disengage | engage | disengage | engage |

Shifting between adjacent speed-ratio positions is achieved in a smooth and continuous fashion as outlined in previous sections. Thus, there is no power interruption during speed ratio change between fixed speed ratios. In addition, at each fixed speed ratio position, both electric machines (EM1, EM2) can act as motors or generators to provide power assisting or regenerative braking functions as in a parallel electric hybrid system. This results in enhanced power and performance of the vehicle system.

Since the engagement or disengagement occurs under natural synchronization of rotational speed for the involved clutch or clutches, simple clutches of positive engagement type can be used instead of the more complex friction clutches. This eliminates the hydraulic system associated wet friction clutches, and thus effectively reduces internal power losses.

Figure 10:
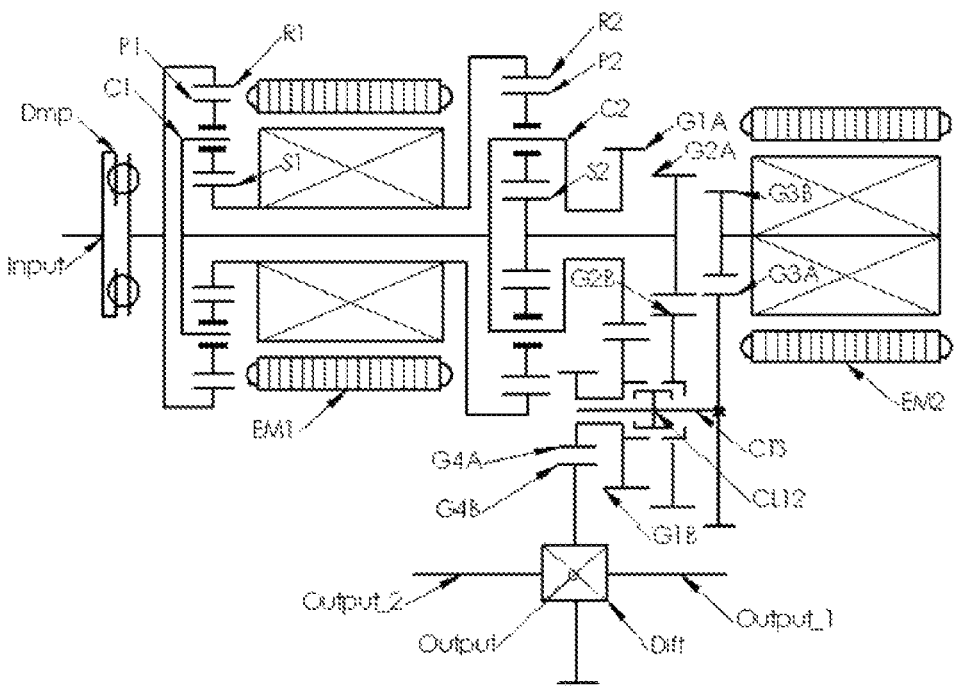
FIG. 10 is a schematic diagram of another preferred embodiment (embodiment 4A) of dual-mode electro-mechanical transmission of the current invention.

Clutch CL1 and clutch CL2 can be integrated to form a combined clutch CL12 (reference to FIG. 10). The combined clutch CL12 is installed on the counter shaft CTS. The combined clutch CL12 has three operation statuses: engaging only with gear G1B, engaging only with gear G2B or engaging with both gears G1B and G2B. Similarly, clutch CL3 can be integrated with brake BR to form a combined clutch-brake CLBR (not shown), installed on the fourth branch, namely on the shaft where the large sun gear S1 is connected to. The combined clutch-brake CLBR has two operation statuses: engaging with the first branch, namely the small sun gear S2, or engaging with a fixed component of the transmission.

Other Operation Status

Embodiment 2 also provides the function for engine start-up. Engine start-up is accomplished either by one of the two electric machines independently or by both electric machines acting collaboratively. For example, when the transmission is in geared neutral, the engine can be started collaboratively by two electric machines; whereas, when the transmission is under pure electric drive mode, the engine can be started by the first electric machine EM1.

When an energy storage device (BT) is used in conjunction with the dual-mode electro-mechanical variable speed transmission, the transmission is capable of providing not only a continuous speed ratio variation but also energy buffering, offering a so-called hybrid drive operation. Under the hybrid drive operation, power between the two electric machines no longer need to be balanced. The electric power generated by one electric machine may be more or less than that consumed by the other electric machine. Under such circumstances, the speed ratio node point at which one of the electric machines has zero rational speed may not coincide with the speed ratio at which the other electric machine has zero torque. The position of speed ratio at which one of the electric machines has zero torque varies with the power imbalance between the two electric machines. However, the position of speed ratio node point at which one of the electric machines has zero speed always remains the same regardless the power imbalance between the two electric machines.

When there is net electric power exchange between the electric power path within the transmission and the energy storage device, the electric machines have to fulfill double duties of both speed ratio regulation and power regulation. Thus, the power ratings of the electric machine should not be less than the maximum electric power split ratio times the rated power at the input shaft of the transmission.

Figure 5:
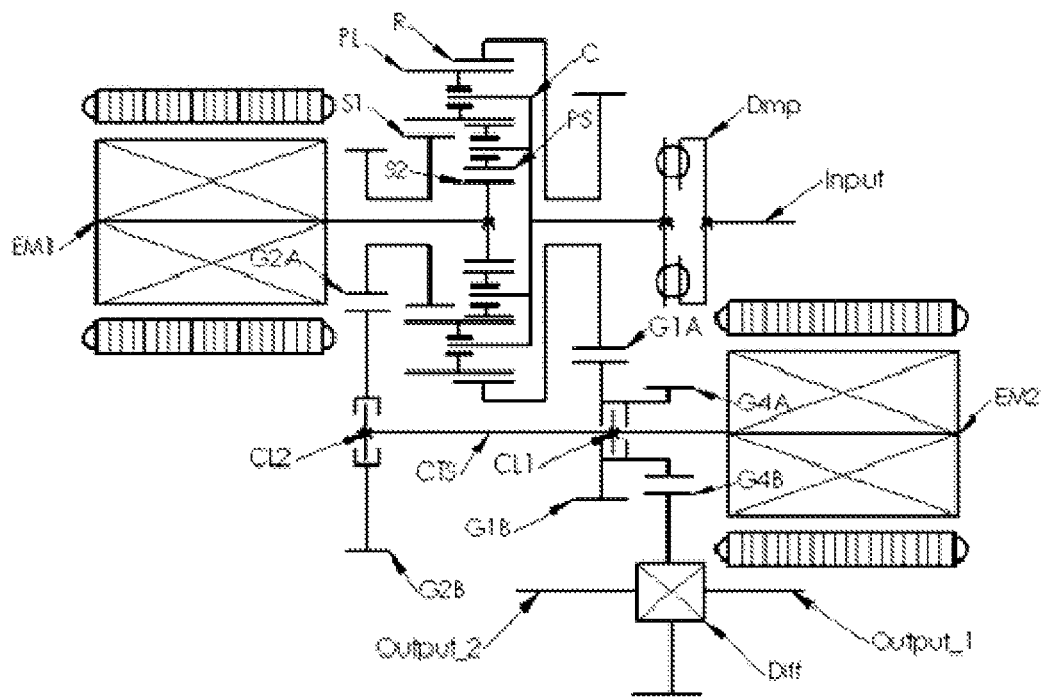
FIG. 5 is a schematic diagram of another preferred embodiment (embodiment 2A) of dual-mode electro-mechanical transmission of the current invention.

FIG. 5 shows embodiment 2A, a simplified version of embodiment 2. In the simplified embodiment, the second electric machine EM2 couples directly to the counter shaft CTS, omitting the third gear set G3A and G3B. The second electric machine EM2, selectively connects either to the second branch (ring gear R) through the first single stage gear set G1A and G1B or to the fourth branch (large sun gear S1) of the four-branch gear system through the second single stage gear set G2A and G2B. In addition, embodiment 2A removes brake BR and the third clutch CL3.

Embodiment 2A has the same functionalities as embodiment 2 except it no longer provides the operations at the second and third fixed speed ratios.

Figure 6:
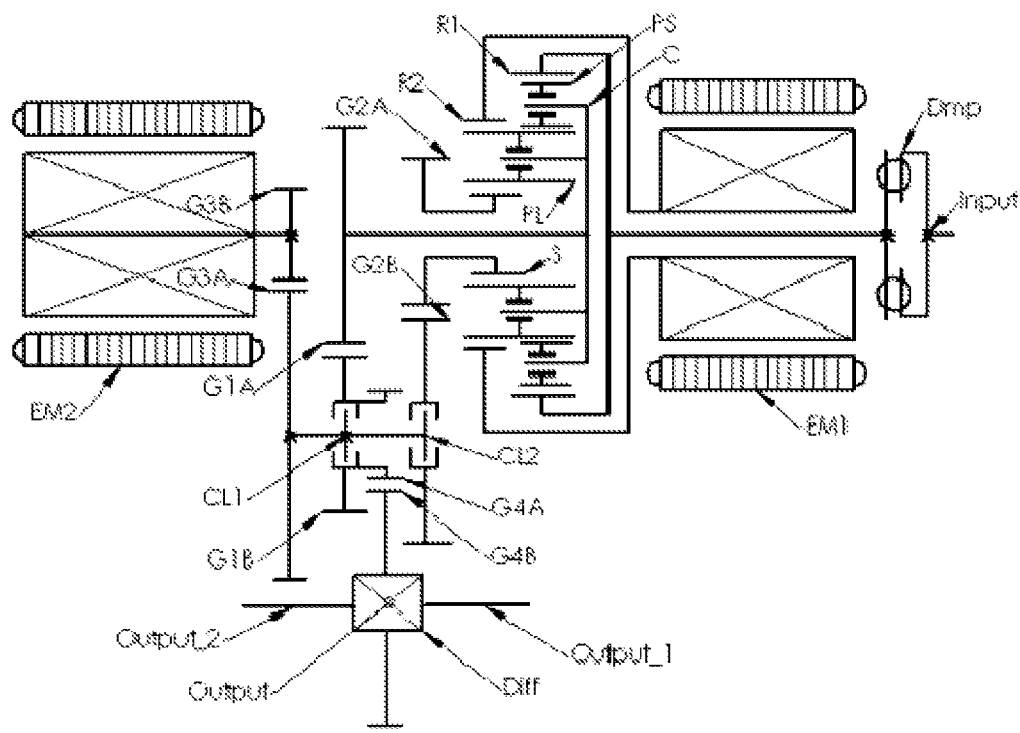
FIG. 6 is a schematic diagram of another preferred embodiment (embodiment 2B) of dual-mode electro-mechanical transmission of the current invention.

Embodiment 2 has other variants. For example, FIG. 6 shows another variant, embodiment 2B, of embodiment 2. In this embodiment, another type of Ravigneaux planetary gear-train was adopted as the four-branch gear system. The Ravigneaux gear-train includes a large ring gear R1 and a small ring gear R2, a set of long planet gears PL, a set of short planet gears PS, a planet carrier C and a sun gear S. Each of the long planet gears PL is in internal meshing engagement with the second ring gear R2 and in external meshing engagement with the sun gear S; each of the short planet gears PS is in internal meshing engagement with the first ring gear R1 and in external meshing engagement with a corresponding long planet gear PL. The second ring gear R2 constitutes the first branch (I) of the four-branch gear system, the planet carrier C being the second branch (II), the first ring gear R1 being the third branch (III) and the sun gear S being the fourth branch (IV). The characteristic parameters $K_a$ and $K_b$ of the four-branch gear system are related to the teeth numbers of the first and second ring gears $Z_{R1}$, $Z_{R2}$ and to the teeth number of the sun gear $Z_S$ $$K_a = \frac{Z_S}{Z_{R1} - Z_S};$$ (8)

$$K_b = \frac{(Z_{R1} + Z_{R2})Z_S}{(Z_{R1} - Z_S)Z_{R2}}$$

The structure and connection characteristics of embodiment 2B can be expressed as R2(EM1)–C(Output,EM2[CL1])–R1(Input)–S(EM2 [CL2])

The notations and definition of symbols employed in above expression follow the same convention as previously described.

A noticeable characteristic in the layout of embodiment 2B is that the first and second electric machines are aligned co-axially with four-branch gear system. Embodiment 2B has the same functionalities as embodiment 2A.

Figure 7:
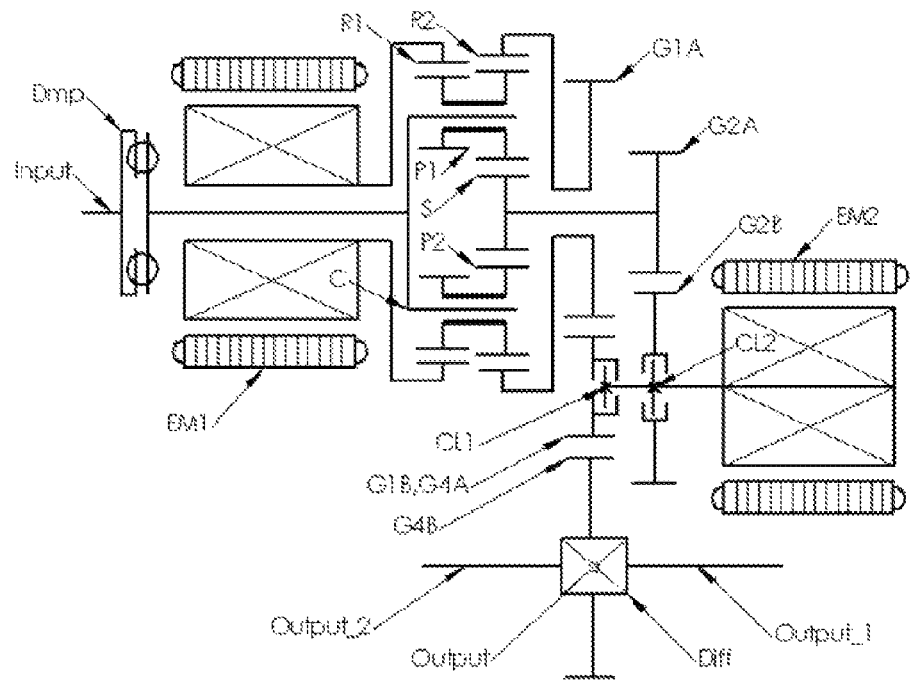
FIG. 7 is a schematic diagram of another preferred embodiment (embodiment 3) of dual-mode electro-mechanical transmission of the current invention.

FIG. 7 shows embodiment 3, the third type embodiment of the current invention. Comparing with the second type of embodiment, embodiment 3 employs a four-branch differential planetary gear train instead of Ravigneaux planetary gear train. Said four-branch differential planetary gear train includes a first and a second ring gears R1 and R2, a first and a second sets of planet gears P1 and P2, a planet carrier C and a sun gear S. The first ring gear R1 engages with the first set of planet gears P1; the second ring gear R2 engages with the second set of planet gears P2; each and every first planet gear couples with a corresponding second planet gear P2, forming a planet pair and having the same axis; the sun gear S engages with the second set of planet gears P2. Thus, the first ring gear R1 constitutes the first branch (I) of the four-branch gear system, the second ring gear R2 constitutes the second branch (II), the planet carrier C constitutes the third branch (III) and the sun gear constitutes the fourth branch (IV). The characteristic parameters of four-branch gear system $K_a$, $K_b$ are determined by the teeth numbers of the first and second ring gears $Z_{R1}$, $Z_{R2}$, the teeth numbers of the first and second planet gears $Z_{P1}$, $Z_{P2}$, and the teeth number of the sun gear $Z_S$ $$K_a = \frac{Z_S}{Z_{R2}};$$ (9)

$$K_b = \frac{Z_{P1}Z_S}{Z_{P2}Z_{R1}}$$

The rotor of the first electric machine EM1 couples directly to the first ring gear R1, establishing a fixed connection to the first branch of the four-branch gear system with a fixed speed ratio of 1. The output shaft system (Output) couples to the second ring gear R2 through gear sets G1A and G1B, and G4A and G4B, establishing a connection to the second branch of the four-branch gear system with a speed ratio of GR1× GR4. Input shaft (Input) couples through a torsion damper (Dmp) to the planet carrier C, establishing a connection to the third branch of the four-branch gear system with a fixed speed ratio of 1. The second electric machine EM2 selectively couples either to the second ring gear R2 through gear set G1A and G1B, establishing a first selective connection to the second branch with a first speed ratio of GR1, or to the sun gear S through gear set G2A and G213, establishing a second selective connection to the fourth branch of the four-branch gear system with a second speed ratio of GR2. Here GR1, GR2 and GR4 are gear teeth ratios defined previously. The structure and connection characteristics of embodiment 3 as shown in FIG. 7 can be expressed as:

R1(EM1)–R2(Output,EM2[CL1])–C(Input)–S(EM2 [CL2])

The notations and definitions of symbols employed in above expression are the same as previously described.

Comparing with the simplified embodiment 2A shown in FIG. 5, embodiment 3 shown in FIG. 7 has not only employed a different four-branch gear system, but also omitted gear G4A, combining it with gear G1B. The power is transmitted to the output shaft system (Output) through the counter shaft with gears G1A, G1B and G4B. Embodiment 3 performs the same functions as embodiments 2A and 2B, and thus will not be repeated herein.

Figure 8:
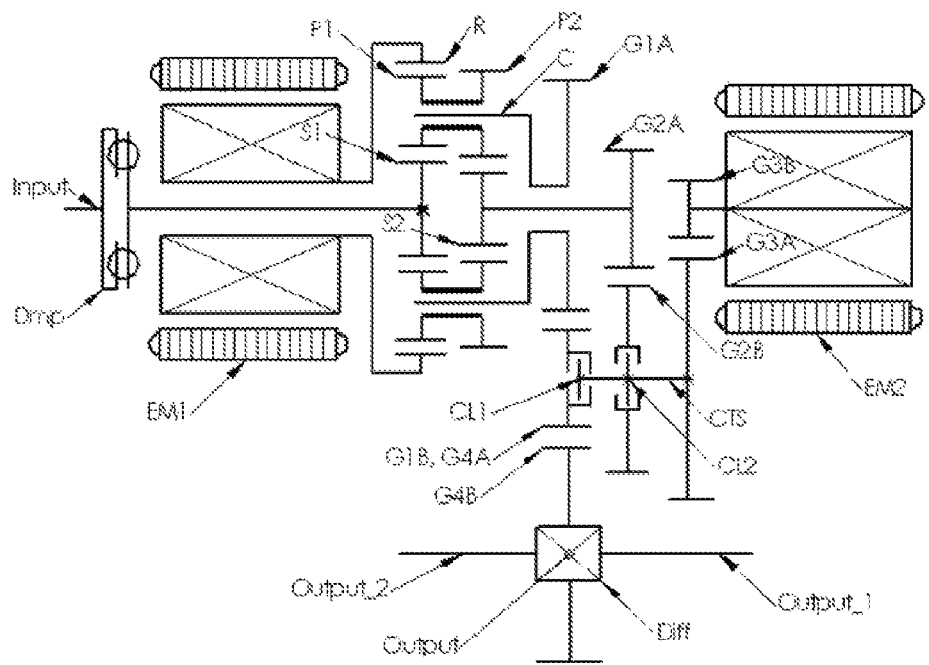
FIG. 8 is a schematic diagram of another preferred embodiment (embodiment 3A) of dual-mode electro-mechanical transmission of the current invention.

Similarly, embodiment 3 has variants. FIG. 8 shows embodiment 3A, which is derived from embodiment 3. In this case, the four-branch differential planetary gear train includes a first sun gear S1, a second sun gear S2, a first set of planet gears P1, a second set of planet gears P2, a planet carrier C and a ring gear R. The first sun gear S1 engages with the first set of planet gears P1. The second sun gear S2 engages with the second set of planet gears P2. Each and every first planet gear P1 couples to a corresponding second planet gear P2, forming a planet pair and having the same axis. The ring gear R engages with the first set of planet gears P1. Thus, the ring gear of the four-branch differential planetary gear train constitutes the first branch (I); the planet carrier C constitutes the second branch (II); the first sun gear S1 constitutes the third branch (III); and the second sun gear S2 constitutes the fourth branch (IV). The characteristic parameters $K_a$ and $K_b$ of the four-branch gear system are determined by the teeth numbers of the first and second sun gears $Z_{S1}$, $Z_{S2}$, the teeth numbers of the first and second planet gears $Z_{P1}$, $Z_{P2}$, and the teeth number of the ring gear $Z_R$:

$$K_a = \frac{Z_{P1} Z_{S2}}{Z_{P2} Z_{S1} - Z_{P1} Z_{S2}}; \quad (10)$$

$$K_b = \frac{Z_{P1} Z_{S2}}{Z_{P2} Z_{S1} - Z_{P1} Z_{S2}} \left(1 + \frac{Z_{S1}}{Z_R}\right)$$

The structure and connection characteristics of the transmission represented by embodiment 3A shown in FIG. 8 can be expressed as $R$(EM1)–$C$(Output,EM2[CL1])–$S1$(Input)–$S2$(EM2 [CL2])

The notations and definitions of symbols employed in above expression are the same as previously described.

A common characteristic of the second and third types of embodiments is that the four-branch gear system is formed by a complete simple three-branch planetary gear train and an incomplete planetary gear train. The planet gears in the two planetary gear trains are coupled together either in co-axial connection arrangements or in meshing engagements. Said complete three-branch planetary gear train includes a ring gear, a set of planet gears, a planet carrier and a sun gear, and has three co-axial rotating members. Said incomplete planetary gear train includes a ring gear, a set of planet gears and a planet carrier, or a sun gear, a set of planet gears and a planet carrier. It has two co-axial rotating members.

Figure 9:
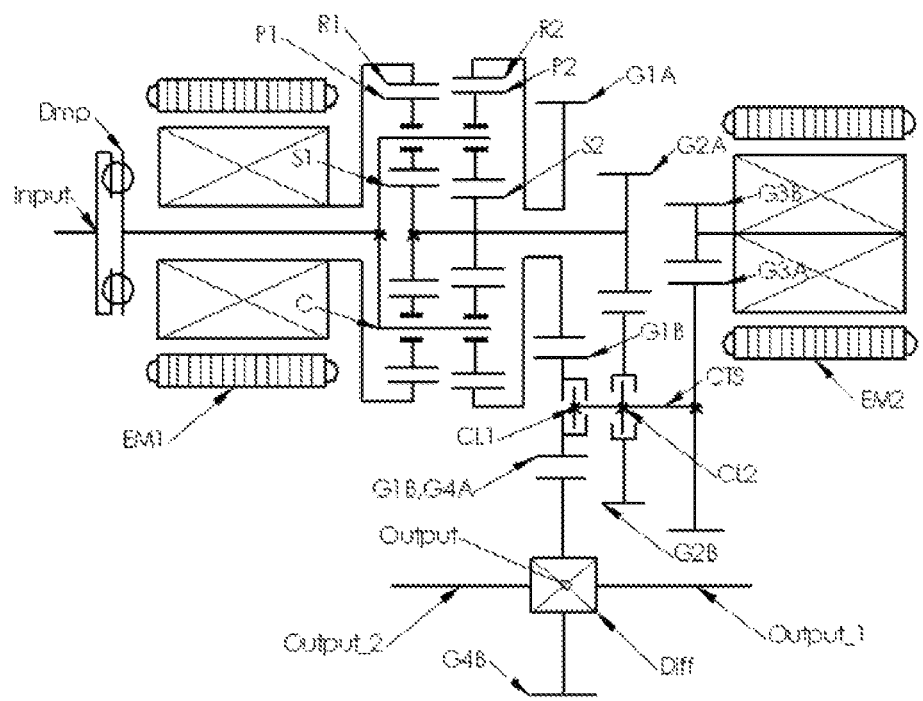
FIG. 9 is a schematic diagram of another preferred embodiment (embodiment 4) of dual-mode electro-mechanical transmission of the current invention.

FIG. 9 shows embodiment 4 of the current invention. It represents a typical example of the fourth type of embodiment. In contrast to the second and third types of embodiments, the four-branch gear system employed in the fourth type of embodiment is a compound planetary gear system formed by two complete three-branch planetary gear trains.

The four-branch planetary gear system of embodiment 4 is comprised of a first complete simple planetary gear train and a second complete simple planetary gear train. Two members of the first planetary gear train couple respectively to the corresponding members of the second planetary gear train, forming a so-called four-branch differential planetary gear system. Each planetary gear train includes a ring gear (R1 or R2), a set of planet gears (P1 or P2), a planet carrier (C1 or C2) and a sun gear (S1 or S2). The first sun gear S1 of the first planetary gear train couples to the second sun gear S2 of the second planetary gear train, forming compound member S1S2; the first carrier C1 of the first planetary gear train couples to the second planet carrier C2 of the second planetary gear train, forming a common planet carrier C1C2. These connections form a four-branch differential planet gear system with the first ring gear R1 being the first branch (I), the second ring gear R2 being the second branch (II), the common carrier C1C2 being the third branch (III) and the compound first and second sun gears S1S2 being the fourth branch (IV). The characteristic parameters of the four-branch differential planetary gear system $K_a$, $K_b$ are determined by the teeth numbers of the first and second ring gears $Z_{R1}$, $Z_{R2}$ and the teeth numbers of the first and second sun gears $Z_{S1}$, $Z_{S2}$ $$K_a = \frac{Z_{S2}}{Z_{R2}}; \quad (11)$$

$$K_b = \frac{Z_{S1}}{Z_{R1}}$$

The structure and connecting characteristics of embodiment 4 can be expressed as:

$R1$(EM1)–$R2$(Output,EM2[CL1])–$C1C2$(Input)–$S1S2$ (EM2[CL2])

The symbols and notations employed in above expression are the same as previously defined.

Using two three-branch planetary gear trains and coupling two members of the first planetary gear train respectively to two dissimilar members of the second planetary gear train, or to one similar member and one dissimilar member of the second planetary gear train can also construct a four-branch compound planetary gear system. As an example, FIG. 10 shows embodiment 4A where the four-branch compound planetary gear system is formed by a first simple planetary gear train and a second simple planetary gear train. The planet carrier C1 of the first planetary gear train couples to a similar member, namely the second planet carrier C2 of the second planetary gear train, forming a common planet carrier C1C2. The sun gear S1 of the first planetary gear train couples to a dissimilar member, the second ring gear R2 of the second planetary gear train, forming a compound member S1R2. The compound member S1R2 constitutes the first branch (I) of the four-branch gear system, the common carrier C1C2 constitutes the second branch (II); the first ring gear R1 of the first planetary gear train constitutes the third branch (III) and the second sun gear S2 of the second planetary gear train constitutes the fourth branch (IV). The characteristic parameters of the four-branch gear system $K_a$, $K_b$ are determined by the teeth numbers of the first and second ring gears $Z_{R1}$, $Z_{R2}$, and the teeth numbers of the first and second sun gears $Z_{S1}$, $Z_{S2}$.

$$K_a = \frac{Z_{S1} Z_{S2}}{Z_{R1} Z_{R2} - Z_{S1} Z_{S2}}; \quad (12)$$

$$K_b = \frac{(Z_{R1} + Z_{S1}) Z_{S2}}{Z_{R1} Z_{R2} - Z_{S1} Z_{S2}}$$

The structure and connecting characteristics of embodiment 4A shown in FIG. 10 can be expressed as:

$S1R2$(EM1)–$C1C2$(Output,EM2[CL12])–$R1$(Input)–$S2$(EM2[CL12])

The symbols and notations used in above expression are the same as previously defined. CL12 represents an integrated clutch.

In embodiment 4A, the second electric machine EM2 is aligned on the same axis as the first electric machine EM1 and the compound planetary gear system. The second electric machine EM2 selectively couples to gear G1B or gear G2B through the integrated clutch CL12, connecting respectively to the second branch or the fourth branch of the four-branch gear system. The integrated clutch CL12 is installed on the counter shaft CTS and has three engagement positions: engaging only with G1B, engaging with both G1B and G2B, or engaging only with G2B. Usually, the integrated clutch CL12 is required to provide at least two engagement positions; that is either engaging with G1B or engaging with G2B.

Figure 11:
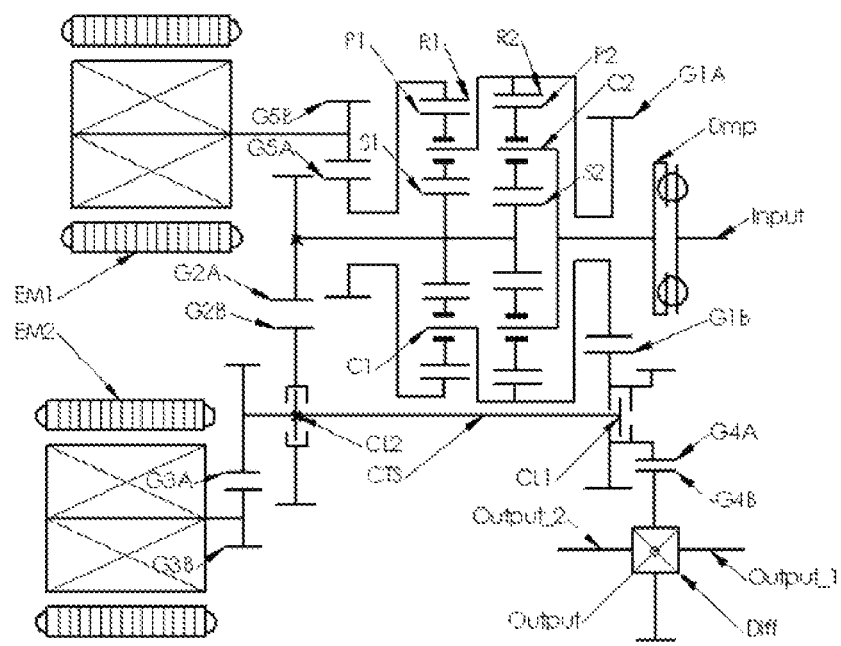
FIG. 11 is a schematic diagram of another preferred embodiment (embodiment 4B) of dual-mode electro-mechanical transmission of the current invention.

FIG. 11 shows embodiment 4B of the current invention. In this embodiment, the four-branch compound planetary gear system is comprised of a first simple planetary gear train and a second simple planetary gear train. The planet carrier C1 of the first planetary gear train couples to the ring gear R2 of the second planetary gear train, forming a first compound member C1R2. The sun gear S1 of the first planetary gear train couples to the sun gear S2 of the second planetary gear train, forming a second compound member S1S2. In this case, the ring gear R1 of the first planetary gear train constitutes the first branch (I) of the four-branch gear system. The first compound member C1R2 constitutes the second branch (II). The planet carrier C2 of the second planetary gear train constitutes the third branch (III) and the second compound member S1S2 constitutes the fourth branch (IV). The characteristic parameters of the four-branch gear system $K_a$ and $K_b$ are determined by the teeth numbers of the first and second ring gears $Z_{R1}$ and $Z_{R2}$, and the teeth numbers of the first and second sun gears $Z_{S1}$ and $Z_{S2}$.

$$K_a = \frac{Z_{S2}}{Z_{R2}}; \quad (13)$$

$$K_b = \frac{Z_{R1}Z_{S2} + Z_{R2}Z_{S1} + Z_{S1}Z_{S2}}{Z_{R1}Z_{R2}}$$

The structure and connecting characteristics of embodiment 4B can be expressed as R1(EM1)–C1R2(Output,EM2[CL1])–C2(Input)–S1S2 (EM2[CL2])

The symbols and notations used in above expression are the same as previously defined.

Comparing to other embodiments described previously, the first electric machine EM1 of embodiment 4B couples through gears G5A and G5B to the ring gear R1 of the first planetary gear train with a speed ratio of GR5, establishing a fixed connection to the first branch of the four-branch gear system. Speed ratio GR5 is calculated as $$GR5 = \frac{Z_{G5B}}{Z_{G5A}} \quad (14)$$

where $Z_{G5A}$ and $Z_{G5B}$ are teeth numbers of gears G5A and G5B, respectively.

Additionally, in embodiment 4B, the first electric machine EM1, the second electric machine EM2 and the four-branch gear system are arranged on different axes of rotation.

In summary, the basic steps in designing and producing the second through fourth types of embodiments described above include constructing a four-branch gear system and connecting the four branches of the gear system to the input shaft, the output shaft system, and the two electric machines in the following manner: coupling the first electric machine to the first branch (or the fourth branch) in a fixed connection with a fixed speed ratio; selectively coupling the second electric machine either to the second branch with a first speed ratio (or the third branch) or to the fourth branch (or the first branch) with a second speed ratio, coupling the input shaft to the third branch (or the second branch) with a fixed speed ratio, and connecting the output shaft system to second branch (or the third branch) with a fixed speed ratio. The input shaft couples to the four-branch gear system through a torsion damper. The connection of first electric machine to the four-branch gear system can be direct or indirect through a single-stage setup gears. The connections of the second electric machine and of the output shaft system to the four-branch gear system are either through a single-stage gear set or through two-stage gear sets.

The performance characteristics of said four-branch gear system are uniquely defined by its characteristic parameters $K_a$ and $K_b$. The relationships between the parameters $K_a$ and $K_b$, and the teeth numbers of the associated gears are determined by the structure of a specific four-branch gear system.

For practicality considerations of the four-branch gear system, it is necessary to impose restrictions on the structure and the characteristic parameters of the four-branch gear system. This is done to ensure that the four-branch gear system so constructed is suitable for constructing the dual-mode electro-mechanical variable speed transmission and is capable of satisfying all specified functional requirements. The aforementioned inequality equation (7) set forth the power constraints for electric machines from the power matching perspective. It is recommended that following condition be satisfied when designing and selecting characteristic parameters for a four-branch gear system.

$$\frac{K_b(K_a + 1)}{K_b - K_a} \leq 2.75 \quad (15)$$

Additionally, for restricting the rotational speed of electric machines, particularly at high speed regime, it is further recommended that the following relationship holds true.

$$\frac{K_b + 1}{GR5} \leq 3 \quad (16a)$$

If the first electric machine couples directly to the four-branch gear system, that is to say GR5=1, the inequality relationship (16a) regresses to $$K_b \leq 2 \quad (16b)$$

Other four-branch gear systems can be constructed by using planetary gear trains. These four-branch gear systems can be used in turn to derive other useful embodiments that incarnate the current invention. Although these embodiments are not described here, they should be considered to be covered under the scope of the current invention.

It should be pointed out that the electric machine referred to in this disclosure is a generic term; it refers to both electric motor and electric generator.

The parts and components required by the aforementioned embodiments can be readily made by industrial manufacturing means. This warrants that the dual-mode electro-mechanic variable speed transmission is obtainable. Said transmission can be operated under two different power splitting modes, and thus is capable of avoiding internal power circulation and offering higher power transmission efficiency. Said transmission can provide, in a wide speed ratio range, independent and continuous output to input speed ratio change and power regulation, extending operation range significantly. The new dual-mode electro-mechanical variable speed transmission reduces power demand on electric machines, making the construction of the transmission simple, more compact, and low cost. The transmission is capable of proving continuous speed changes from reverse to full stop to forward without the need for vehicle launching device. It significantly improves the overall fuel efficiency of the vehicle.

The invention claimed is:

1. A dual-mode electro-mechanical variable speed transmission comprising
   a gear system, an input shaft, an output shaft system, a first electric machine, a second electric machine and at least one clutch;
   said output shaft system includes at least one of an output shaft connected with at least one drive wheel and a differential connected to the output shaft;
   said gear system includes at least four component branches representing at least four co-axial rotatable components of the gear system, respectively; wherein rotational speeds of any two of the at least four component branches define the speed for the remaining ones of the component branches;
   the first electric machine couples in a clutch-less mechanical connection to a first component branch of the gear system;
   said output shaft or said differential connected to said output shaft couples in a clutch-less rotatable connection to a second component branch of the gear system;
   said input shaft couples directly or indirectly in a rotatable connection to a third component branch of the gear system;
   the second electric machine couples selectively via said at least one clutch to at least the second component branch that is connected to the output shaft system with a first speed ratio, or to a fourth component branch of the gear system with a second speed ratio, wherein said first speed ratio is different from said second speed ratio, whereby the dual-mode electro-mechanical variable speed transmission is switchable between an output power split mode of operation and a compound power split mode of operation solely by the at least one clutch.

2. The dual-mode electro-mechanical variable speed transmission according to claim 1 wherein
   said gear system is a four-branch planetary gear set having four co-axial rotatable components that are represented by a small sun gear, a ring gear, a planet carrier and a large sun gear, respectively;
   the first electric machine couples in a clutch-less mechanical connection to the small sun gear;
   said output shaft or said differential couples in a clutch-less rotatable connection to the ring gear;
   said input shaft couples directly or indirectly via a damping device to the planet carrier;
   said second electric machine couples only in selective connections via said at least one clutch either to the ring gear with the first speed ratio, or to the large sun gear with the second speed ratio.

3. The dual-mode electro-mechanical variable speed transmission according to claim 1 wherein
   said gear system has four co-axial rotatable components; wherein the first component is a small sun gear, the second component is a ring gear, the third component is a planet carrier and the fourth component is a large sun gear;
   said small sun gear couples in a mechanical connection to the first electric machine;
   said ring gear couples in a clutch-less rotatable connection to the output shaft system and in a mechanically selective connection via said at least one clutch to the second electric machine;
   said planet carrier couples directly or indirectly via a damping device to the input shaft;
   said large sun gear couples in a selective connection via said at least one clutch to the second electric machine.

4. The dual-mode electro-mechanical variable speed transmission according to claim 1 wherein
   said electric machines have maximum continuous power rating $P_{em}$, said input shaft receives a maximum power $P_{in}$;
   said gear system is a four-branch gear system having four component branches, representing four co-axial rotatable components; the rotational speeds of the four component branches are represented by a four-branch speed nomograph in which a nomograph distance between the first and third component branches measures $K_b$ units in length, a nomograph distance between the second and third component branches measures $K_a$ units in length, and a nomograph distance between the third and fourth component branches is 1.0 units in length; $K_a$ and $K_b$ are characteristic parameters of said four-branch gear system;
   wherein said characteristic parameters $K_a$ and $K_b$ satisfy at least one of the following relationships:

$$\frac{K_b(K_a+1)}{K_b-K_a} \le \left(\frac{1+P_{em}/P_{in}}{1-P_{em}/P_{in}}\right)^2$$

$$\frac{K_b(K_a+1)}{K_b-K_a} \le 2.75$$

$$K_b \le 2$$

where $P_{em}$ is the maximum continuous power rating of the electric machines, and $P_{in}$ is the maximum power that the input shaft receives.

5. The dual-mode electro-mechanical variable speed transmission according to claim 1 wherein
   said gear system is a four-branch gear system having four components branches representing four co-axial rotatable components of the gear system; the rotational speeds of the four component branches are represented by a four-branch speed nomograph in which a nomograph distance between the first and third component branches measures $K_b$ units in length, a nomograph distance between the second and third component branches measures $K_a$ units in length, and a nomograph distance between the third and fourth component branches is 1.0 units in length; $K_a$ and $K_b$ are characteristic parameters of said four-branch gear system;
   said second component branch of the gear system is selectively coupled via the at least one clutch to the second electric machine through at least a first pair of meshing gears (G1A, G1B), said first pair of meshing gears includes a first drive gear (G1A) and a first driven gear (G1B) wherein the first drive gear (G1A) couples directly to the second component branch of the gear system;

said fourth component branch is selectively coupled via the at least one clutch to the second electric machine through at least a second pair of meshing gears (G2A, G2B), said second pair of meshing gears includes a second drive gear (G2A) and a second driven gear (G2B), wherein the second drive gear (G2A) couples directly to said fourth component branch of the gear system;

said dual-mode transmission provides at least two different operating modes; wherein switching between said at least two different operating modes is accomplished through said at least one clutch at a mode switching point; wherein at the mode switching point, said at least one clutch is synchronized with no speed interruption and the rotational speed ratio of the second component branch to the third component branch of the gear system is $SR_b$;

wherein said characteristic parameters $K_a$ and $K_b$ and said speed ratio $SR_b$ satisfy at least one of the following relationships:

$$\frac{(K_a+1)(1-SR_b)}{K_a SR_b} + 1 = \frac{GR2}{GR1}$$

$$\frac{K_b+1}{K_b-K_a} = \frac{GR2}{GR1}$$

where GR1 is a teeth ratio of the first driven gear to the first drive gear, and GR2 is a teeth ratio of the second driven gear to the second drive gear.

6. The dual-mode electro-mechanical variable speed transmission according to claim 1 wherein
said dual-mode transmission includes at least one counter shaft; said at least one clutch is installed on said at least one counter shaft;
said second electric machine couples to said gear system only through said at least one counter shaft.

7. The dual-mode electro-mechanical variable speed transmission according to claim 6 wherein
the second electric machine connects to said at least one counter shaft through at least a pair of meshing gears (G3A, G3B).

8. The dual-mode electro-mechanical variable speed transmission according to claim 7 wherein
the output shaft system couples to said second component branch of the gear system through at least another pair of meshing gears (G4A, G4B).

9. The dual-mode electro-mechanical variable speed transmission according to claim 1 wherein
said dual-mode transmission includes a second clutch (CLBR) and a fixed component;
said fourth component branch of the gear system couples selectively via said second clutch (CLBR) to the fixed component of the transmission or to any other component branch of the gear system.

10. A dual-mode electro-mechanical variable speed transmission comprising a four-branch gear system, an input shaft, an output shaft system, a first electric machine, a second electric machine, and a first clutch and a second clutch;
the output shaft system includes at least an output shaft;
said four-branch gear system is a four-branch planetary gear set having four co-axial rotatable component branches wherein a first component branch, a second component branch, a third component branch, and a fourth component branch are represented by a small sun gear, a ring gear, a planet carrier, and a large sun gear, respectively; and wherein rotational speeds of any two of the four component branches define the speed for the remaining component branches;
said first electric machine couples in a direct, coaxial, mechanical connection to the small sun gear;
said input shaft couples directly, via a damping device, to the planet carrier; and
said second electric machine couples only in selective connections to the ring gear with a first speed ratio via the first clutch, or to the large sun gear with a second gear ratio different from the first speed ratio via the second clutch;
the rotational speeds of the four component branches are represented by a four-branch speed nomograph in which a nomograph distance between the first and third component branches measures $K_b$ units in length, a nomograph distance between the second and third component branches measures $K_a$ units in length, and a nomograph distance between the third and fourth component branches is 1.0 units in length; $K_a$ and $K_b$ are characteristic parameters of said four component branch gear system.

11. A dual-mode electro-mechanical variable speed transmission comprising a four-branch gear system, an input shaft, an output shaft system, a first electric machine, a second electric machine, and at least one clutch;
said output shaft system includes at least one of an output shaft connected with at least one drive wheel and a differential connected to the output shaft;
said four-branch gear system has four co-axial rotatable component branches including a first component branch, a second component branch, a third component branch, and a fourth component branch; and wherein rotational speeds of any two of the four component branches define the speed for the remaining component branches;
said first electric machine couples in a clutch-less mechanical connection to the first component branch;
said input shaft couples directly, via a damping device, to the third component branch; and
said second electric machine couples only in selective connections to the second component branch with a first speed ratio via said at least one clutch, or to the fourth component branch with a second speed ratio different from the first speed ratio via said at least one clutch, whereby the dual-mode electro-mechanical variable speed transmission is switchable between an output power split mode of operation and a compound power split mode of operation solely by the at least one clutch;
the rotational speeds of the four component branches are represented by a four-branch speed nomograph wherein the nomograph position of the first component branch is at one end of the speed nomograph, the nomograph position of the fourth component branch is at the other end of the speed nomograph; and wherein a nomograph distance between the first and third component branches measures $K_b$ units in length, a nomograph distance between the second and third component branches measures $K_a$ units in length, and a nomograph distance between the third and fourth component branches is 1.0 units in length; $K_a$ and $K_b$ are characteristic parameters of said four component branch gear system.

12. The dual-mode electro-mechanical variable speed transmission according to claim 11 wherein the first component branch, the second component branch, the third component branch, and the fourth component branch are each represented respectively by a component in one of the following component sets:
- (1) a first sun gear, a ring gear, a planet carrier, and a second sun gear; or
- (2) a first ring gear, a planet carrier, a second ring gear, and a sun gear; or
- (3) a first ring gear, a second ring gear, a planet carrier and a sun gear; or
- (4) a ring gear, a planet carrier, a first sun gear and a second sun gear; or
- (5) a first ring gear, a second ring gear, a planet carrier, and a compound sun gear; or
- (6) a compound sun and ring gear, a planet carrier, a ring gear, and a sun gear; or
- (7) a ring gear, a compound planet carrier and ring gear, a planet carrier, and a compound sun gear.

* * * * *